(12) United States Patent
Lu et al.

(10) Patent No.: US 11,440,308 B2
(45) Date of Patent: Sep. 13, 2022

(54) MOVABLE LAMINATOR AND PLASTIC FLOORING LAMINATING DEVICE

(71) Applicant: WUXI BOYU PLASTIC MACHINERY CO., LTD., Jiangsu (CN)

(72) Inventors: Ding-Yi Lu, Jiangsu (CN); Pei-Dong Zhao, Jiangsu (CN)

(73) Assignee: WUXI BOYU PLASTIC MACHINERY CO., LTD., Jiangsu (CN)

( * ) Notice: Subject to any disclaimer, the term of this patent is extended or adjusted under 35 U.S.C. 154(b) by 220 days.

(21) Appl. No.: 16/615,817

(22) PCT Filed: May 23, 2018

(86) PCT No.: PCT/CN2018/000186
§ 371 (c)(1),
(2) Date: Nov. 22, 2019

(87) PCT Pub. No.: WO2018/214509
PCT Pub. Date: Nov. 29, 2018

(65) Prior Publication Data
US 2020/0079066 A1    Mar. 12, 2020

(30) Foreign Application Priority Data

May 23, 2017   (CN) .......................... 201710368817.8

(51) Int. Cl.
*B32B 37/10*     (2006.01)
*B32B 37/06*     (2006.01)
(Continued)

(52) U.S. Cl.
CPC .............. *B32B 37/10* (2013.01); *B32B 37/06* (2013.01); *B29K 2027/06* (2013.01);
(Continued)

(58) Field of Classification Search
None
See application file for complete search history.

(56) References Cited

U.S. PATENT DOCUMENTS 3,383,266 A * 5/1968 Helm ...................... B29C 33/34
                                                     156/313
8,236,127 B2 * 8/2012 Tashiro .................. B65H 49/10
                                                     156/254

FOREIGN PATENT DOCUMENTS

CN       104057287      9/2014
CN       204736392      11/2015
(Continued)

OTHER PUBLICATIONS

Chen, Guangwei et al., "Wood-based Panel Press", Hydraulic Transmission and Wood-Based Panel Machinery, Apr. 30, 2014, with English abstract, pp. 1-335.
(Continued)

*Primary Examiner* — Linda L Gray
(74) *Attorney, Agent, or Firm* — JCIP Global Inc.

(57) ABSTRACT

The present invention relates to a movable laminator and a plastic flooring laminating device applied by same. A laminating mechanism, a driving mechanism and a conveying mechanism assembled on a rack compose the laminator which can make continuous reciprocating movements. The movable laminator is then disposed in an automatic production line for plastic flooring to cooperate with an extruder, a rolling unit and a drawing mechanism to laminate a plastic flooring material composed of a substrate layer, a printed layer and a wear-resisting layer into a finished plastic flooring product in an automatic operation manner. Because the time of the lamination of the material by the movable laminator can match the speed at which the material is conveyed and moved, the laminating mechanism is driven (Continued)

by the second power source to move from the front section position to the rear section position on the rack.

8 Claims, 7 Drawing Sheets

(51) Int. Cl.
*B32B 37/20* (2006.01)
*B32B 38/06* (2006.01)
*B32B 38/00* (2006.01)
*B32B 41/00* (2006.01)
*B29K 27/06* (2006.01)
*E04F 15/10* (2006.01)

(52) U.S. Cl.
CPC .............. *B32B 37/20* (2013.01); *B32B 38/06* (2013.01); *B32B 38/145* (2013.01); *B32B 41/00* (2013.01); *B32B 2419/04* (2013.01); *E04F 15/107* (2013.01); *Y10T 156/1712* (2015.01); *Y10T 156/1727* (2015.01); *Y10T 156/1741* (2015.01)

(56) References Cited

FOREIGN PATENT DOCUMENTS

| | | |
|---|---|---|
| CN | 206765512 | 12/2017 |
| JP | 2004148701 | 5/2004 |

OTHER PUBLICATIONS

"International Search Report (Form PCT/ISA/210) of PCT/CN2018/000186," dated Aug. 9, 2018, with English translation thereof, pp. 1-4.

* cited by examiner

MOVABLE LAMINATOR AND PLASTIC FLOORING LAMINATING DEVICE

CROSS-REFERENCE TO RELATED APPLICATION

This application is a 371 of international application of PCT application serial no. PCT/CN2018/000186, filed on May 23, 2018, which claims the priority benefit of China application no. 201710368817.8, filed on May 23, 2017. The entirety of each of the above mentioned patent applications is hereby incorporated by reference herein and made a part of this specification.

TECHNICAL FIELD

The present invention relates to a utility model of a laminator which can be applied in the formation of plastic flooring, in particular to a laminator assembly structure which can make continuous reciprocating movements, and a forming device which applies the movable laminator to the automatic production of plastic flooring.

BACKGROUND OF THE INVENTION

Using plastic materials as a replacement for natural timber in the production of flooring to reduce the destruction of natural resources is a trend in the development of plastic flooring products nowadays. As known from the background, conventional flooring includes a printed layer and a wear-resisting layer which are adhered on the surface of a bottom most substrate, and the substrate is made generally of a PVC material. Plastic flooring can be formed by a roller method or a hot-pressing method. However, the hot-pressing method requires much manpower, and while the automation degree of roller operation is high, the embossing effect cannot achieve a clear and prominent pattern structure. Moreover, when a typical laminator which is of a fixed structure is used in forming operation of embossing plastic flooring, a lamination step and a heating process must be carried out to form a finished plastic flooring product by lamination, which takes about 30 minutes, as a result, the efficiency of production is poor, automatic production is impossible to perform, and therefore it requires improvement.

In view of this, the inventor probed into the problems of the prior design mentioned above in depth, and, with years of experience in research and development and manufacturing in the related industry, actively sought solutions. After making an effort in research and development for a long term, the inventor finally successfully developed a continuous movable laminator and a plastic flooring laminating device applied by same in order to improve the problems of the prior design.

SUMMARY OF THE INVENTION

The main object of the present invention is to provide a continuous movable laminator and a plastic flooring laminating device applied by same. The present invention enables the laminator to have the function of following the speed of material conveying to move when laminating the material, achieving the use effect of reciprocating lamination.

Another object of the present invention is to apply the movable laminator in a production line for embossing the external surface of plastic flooring so as to increase the efficiency of production by using automatic equipment and, at the same time, make the surface pattern of plastic flooring more prominent, thus improving the competitiveness and quality of the product.

In order to achieve the aforementioned objects of the utility model, the present invention provides a movable laminator, which is characterized by including a rack, with a laminating mechanism, a driving mechanism and a conveying mechanism disposed on the rack.

With regard to the laminating mechanism, an upper die base, a lower die base and at least one first power source are disposed on a die frame, one end of the first power source is provided with a protruding telescopic shaft, and one end of the telescopic shaft is connected fixedly to the outer edge surface of the upper die base in order to drive the upper die base to move up and down.

The driving mechanism includes a second power source, two slide rails, and two sliders, the second power source is fixed on the rack, the two slide rails are disposed respectively on both sides of the rack, the two slide rails are fixed at positions of the laminating mechanism corresponding to the outer sides of the two slide rails, so that the two sliders are embedded in the corresponding slide rails, and a connecting part is disposed between the second power source and the laminating mechanism, so that the laminating mechanism can be driven by the second power source to move on the slide rails.

The conveying mechanism is disposed on the top of the rack, and the conveying surface is on the same horizontal plane as the laminating surface of the lower die base, and the conveying mechanism is configured to assist the movement of the material to be laminated by the laminator.

Thus, when the movable laminator laminates the material, the time of lamination can match the speed at which the material is conveyed and moved, the laminating mechanism is driven by the second power source to move from the front section position to the rear section position on the rack and, after lamination is complete, is driven again by the second power source to move to the front section position for the next laminating operation, and thereby the production operation of reciprocating lamination is accomplished.

In the movable laminator, the first power source is a hydraulic cylinder.

In the movable laminator, a die plate is disposed on the outer edge surface of the upper die base corresponding to the lower die base, and an embossing pattern is formed on the outer plate surface of the die plate.

In the movable laminator, the second power source is a servo motor, one end of which can drive a lead screw to rotate, and one end of the connecting part is screwed on the lead screw.

In the movable laminator, the conveying mechanism includes rollers, moreover, the opposite inner surfaces of rack bars on both sides of the top of the rack are provided respectively with accommodating notches, and each of the rollers is disposed in the two accommodating notches by utilizing the shafts at both ends; when the laminating mechanism is disposed on the rack, the rollers are located on both sides of the laminating mechanism, and the conveying surface formed by the end faces of the rollers is flushed with the laminating surface of the lower die base; and moreover, the rollers located on both sides of the laminating mechanism are connected respectively by utilizing a linkage part, so that, when the laminating mechanism moves, the of rollers can be driven by the laminating mechanism to move.

In this way, the automatic reciprocating continuous lamination operation of plastic flooring can be achieved, thus not only achieving a pattern structure with better quality but also increasing the efficiency of production.

The present invention also provides a plastic flooring laminating device, which is characterized by at least including an extruder, a rolling unit, a movable laminator according to claim 1, and a drawing mechanism. The extruder, the rolling unit, the movable laminator and the drawing mechanism are all connected electrically to an electric control system to laminate a plastic flooring material including a substrate layer, a printed layer and a wear-resisting layer into a finished plastic flooring product in an automatic operation mode.

The extruder is configured to form the substrate layer, and one end is provided with a discharge port to extrude out the substrate layer and convey the substrate layer to the rolling unit.

The rolling unit at least includes a calender, a first unwinding mechanism, and a second unwinding mechanism, the first unwinding mechanism and the second unwinding mechanism respectively convey the printed layer and the wear-resisting layer to the calender, and the calender then utilizes guide rollers and pinch rollers to cooperate to roll and pre-bond the substrate layer, the printed layer and the wear-resisting layer into a whole, and then conveys the material to the movable laminator.

The outer edge surface of the upper die base of the movable laminator corresponding to the lower die base is provided with a die plate, and an embossing pattern is formed on the outer plate surface of the die plate.

The drawing mechanism can generate conveying power, and is disposed after the movable laminator in the operation procedure of the production line to drive the plastic flooring material to move.

Thus, when the movable laminator laminates the plastic flooring material, the time of lamination can match the speed at which the plastic flooring material is conveyed and moved by the drawing mechanism, consequently, the laminating mechanism is driven by the second power source to move from the front section position to the rear section position on the rack, and, after the lamination is complete and the die is opened, is driven again by the second power source to move to the front section position for the next laminating operation, thus accomplishing the production operation of reciprocating lamination, and consequently, not only can a pattern structure with better quality be achieved, but also the efficiency of production is increased.

It is believed that the above objects, structures and features of the present invention can be understood in depth and concretely from the following detailed description of a preferred embodiment with respect to the technology, means and effects of the present invention taken in conjunction with the drawings.

DETAILED DESCRIPTION OF THE INVENTION

Figure 1:
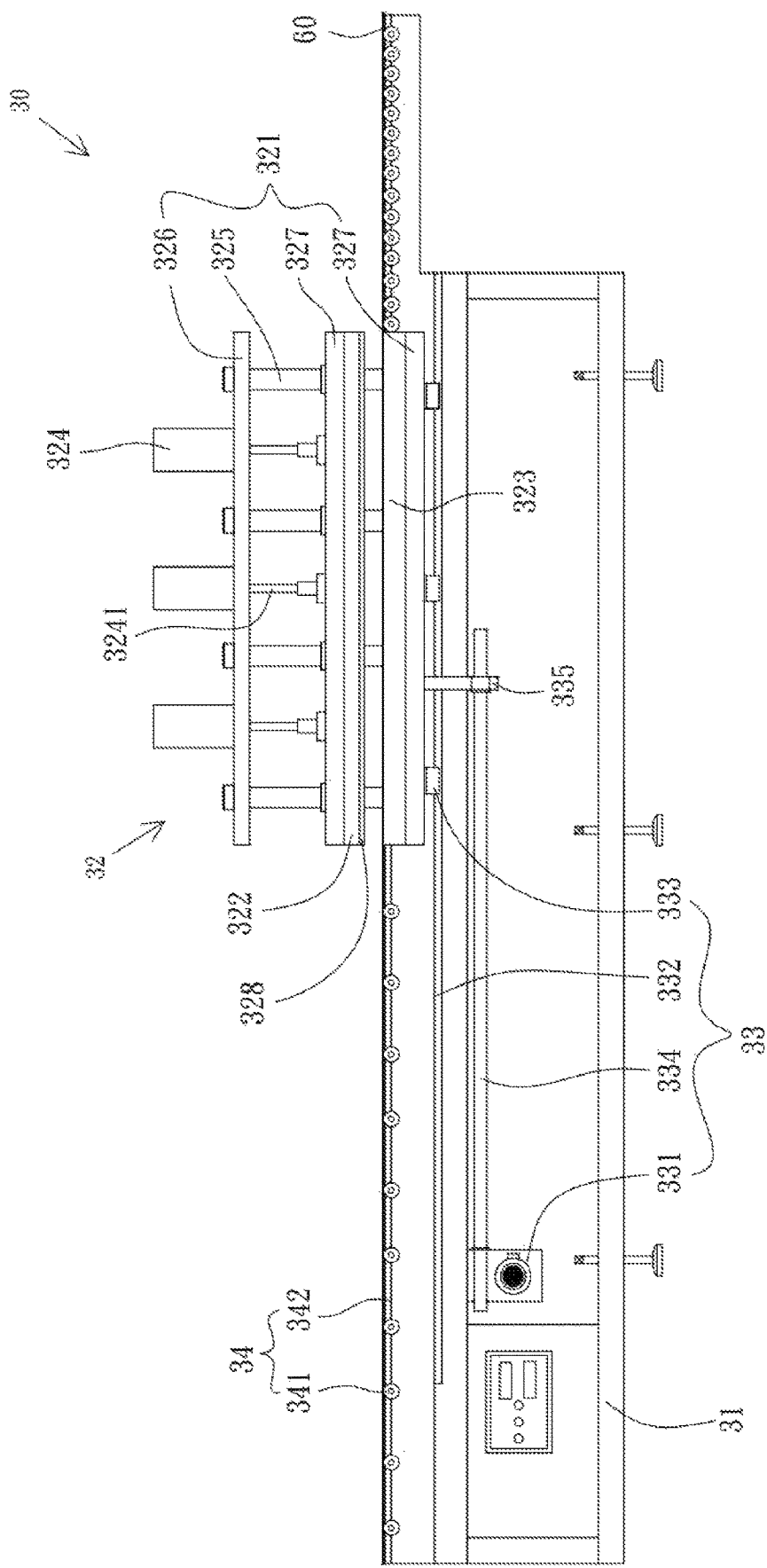
FIG. 1 is a front assembly plan view of a movable laminator of the present invention.
Figure 2:
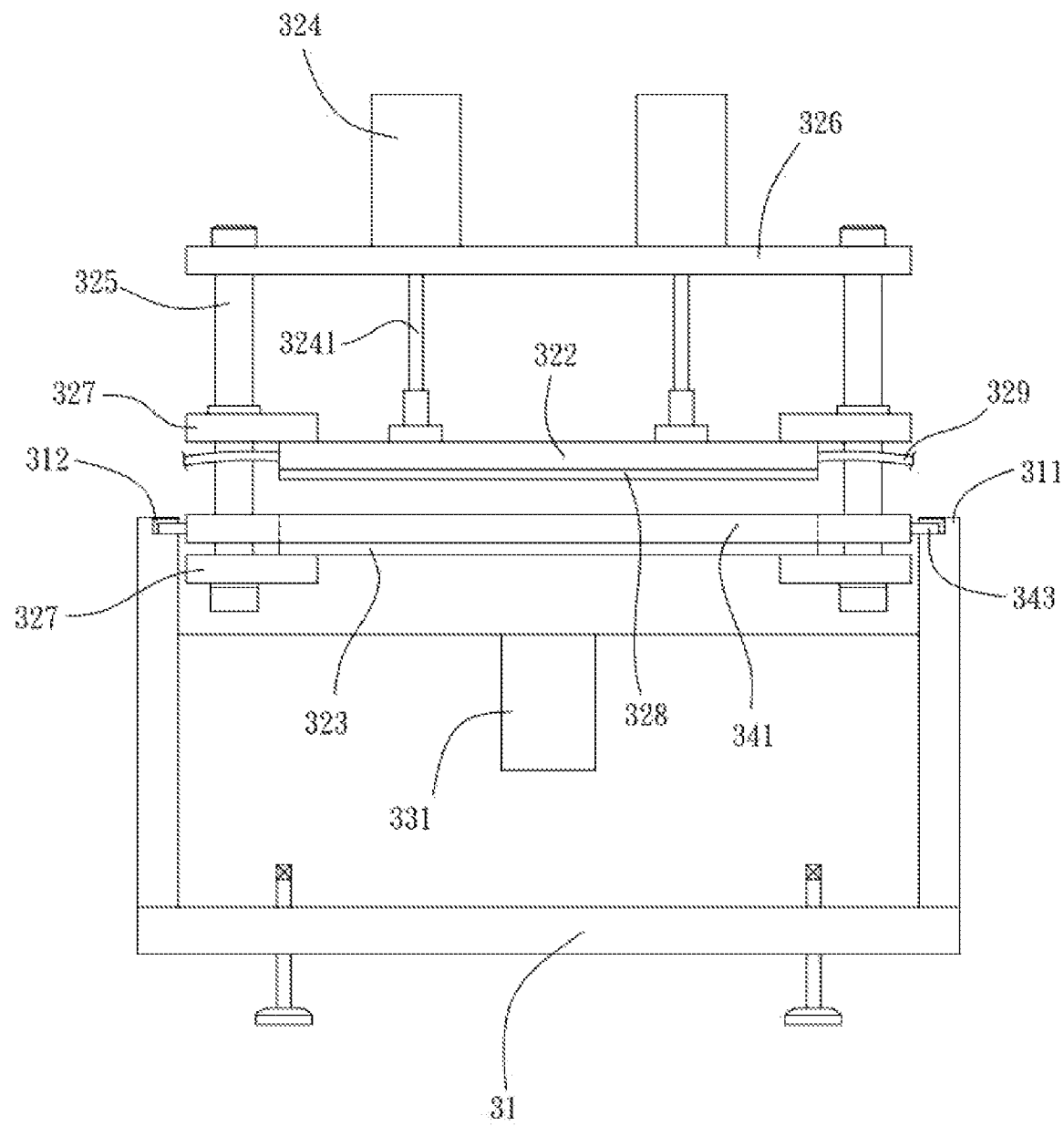
FIG. 2 is a side assembly plan view of the movable laminator of the present invention.
Figure 3:
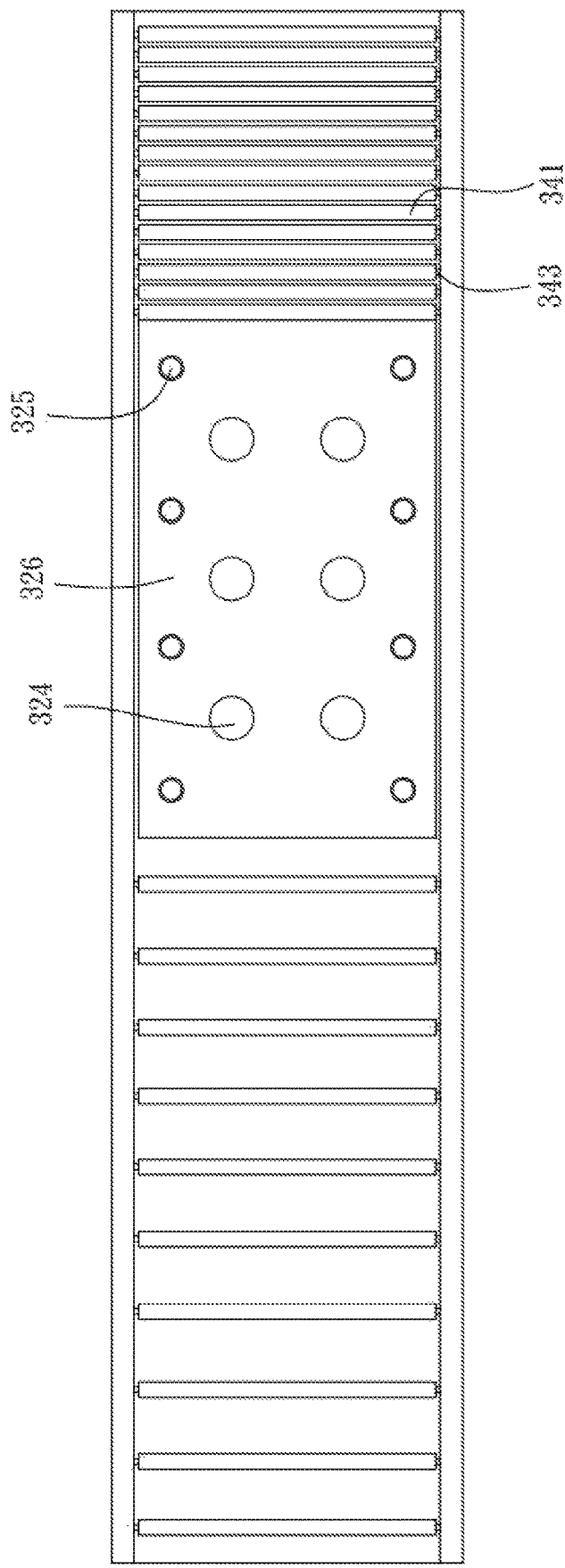
FIG. 3 is a top assembly plan view of the movable laminator of the present invention.
Figure 4:
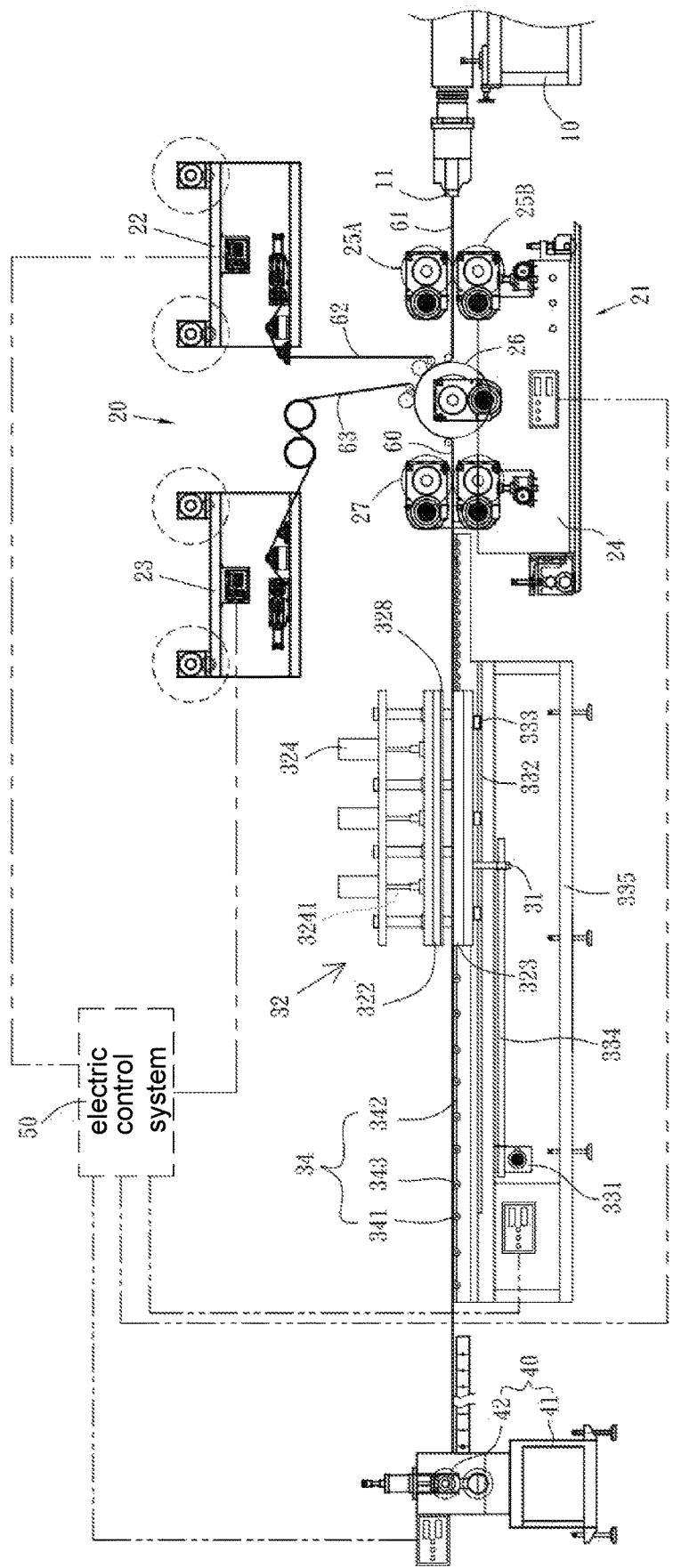
FIG. 4 is an assembly plan view of a plastic flooring laminating device of the present invention.
Figure 5:
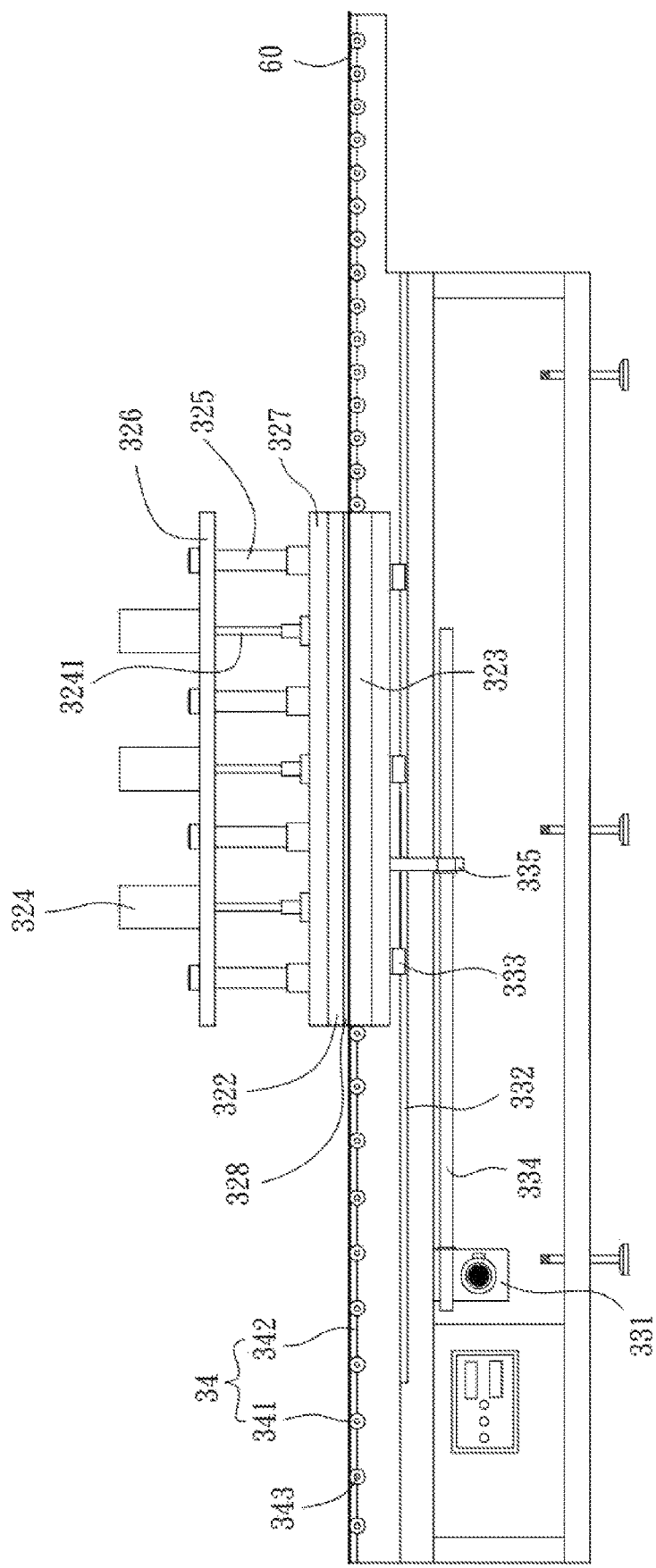
FIG. 5 is a schematic view of a plastic flooring material laminated by the movable laminator of the present invention.

Referring to FIGS. 1-6, the present invention relates to a continuous movable laminator and a plastic flooring laminating device applied by same, and the plastic flooring laminating device includes the movable laminator 30 which can make reciprocating movements, and the movable laminator 30 is applied in production equipment for automatic lamination of plastic flooring. The plastic flooring laminating device at least includes an extruder 10, a rolling unit 20, a movable laminator 30, and a drawing mechanism 40, and these mechanisms are connected electrically to an electric control system 50 to laminate a plastic flooring material 60 including a substrate layer 61, a printed layer 62 and a wear-resisting layer 63 into a finished plastic flooring product in an automatic operation mode.

The extruder 10 is a typical plastic extruder, PVC plastic can be adopted as a raw material, with foaming agent then being added according to product requirement, and one end is provided with a discharge port 11 which is configured to extrude out the substrate layer 61 and convey the substrate layer 61 to the rolling unit 20.

The rolling unit 20 at least includes a calender 21, a first unwinding mechanism 22, and a second unwinding mechanism 23, and the first unwinding mechanism 22 and the second unwinding mechanism 23 convey the printed layer 62 and the wear-resisting layer 63 to the calender 21 respectively. The calender 21, which may be of a horizontal three-roller, four-roller or five-roller structure, includes first and second conveying rollers 25A and 25B disposed opposite to each other in a superimposing manner at one side of a rack 24, and a mirror roller 26 and a rolling and pre-bonding roller 27 arranged at the other side, which are configured to roll and pre-bond the substrate layer 61 conveyed after being formed by the extruder 10 and the printed layer 62 and the wear-resisting layer 63 conveyed by the two unwinding mechanisms 22 and 23 into a whole and then convey the plastic flooring material 60 to the movable laminator 30. As the rolling unit 20 is generally a known machine, the description thereof will not be repeated.

The movable laminator 30 is provided with a laminating mechanism 32, a driving mechanism 33 and a conveying mechanism 34 which are disposed on a rack 31.

The laminating mechanism 32 includes an upper die base 322, a lower die base 323 and two first power sources 324 which are assembled by utilizing a die frame 321, the die frame 321 includes an upper positioning plate 326 through which guide rods 325 pass, and connecting plates 327 connected to the upper die base 322 and the lower die base 323, and the two first power sources 324 are fixed on the positioning plate 326; the two first power sources 324 may be hydraulic cylinders, one end of which is provided with a telescopic shaft 3241, one end of the telescopic shaft 3241 is connected fixedly to the outer edge surface of the upper die base 322, and when the two first power sources 324 operate, the upper die base 322 can be driven to move up and down. Moreover, the outer edge surface of the upper die base 322 is provided with a replaceable die plate 328 corresponding to the lower die base 323, and an embossing pattern is formed on the outer plate surface of the die plate 328. In addition, an electric heater may be disposed inside the upper die base 322 and the lower die base 323 to generate high temperature, or a circulating loop 329 may be mounted to guide hot oil circulation to generate high temperature, so that the high temperature is conducted to the die plate 328, and thereby the movable laminator 30 can form an embossed pattern in a hot pressing manner and bond the plastic flooring material 60 into a whole. Alternatively, as the plastic flooring material 60 is pre-bonded, if lamination does not require hot pressing due to the high temperature of the substrate layer 61 after extrusion, cooling water can be supplied into the circulating loop 329 of the upper die base 322 and the lower die base 323 to generate a low temperature for cooling, and the low temperature is conducted to the die plate 328, so that the movable laminator 30 can form an embossed pattern and laminate the plastic flooring material 60 into a whole in a cold pressing manner.

The driving mechanism 33 includes a second power source 331, slide rails 332, and sliders 333. The second power source 331 is fixed on the rack 31, and may be a servomotor, one end of which can drive a lead screw 334 to rotate, and a connecting part 335 is disposed between the lead screw 334 and the lower die base 323. The two slide rails 332 are disposed respectively on both sides of the rack 31, while the two sliders 333 are disposed fixedly at outside positions of the laminating mechanism 32 corresponding to the two slide rails 332. By embedding the two sliders 333 in the corresponding slide rails 332, the laminating mechanism 32 can be driven by the second power source 331 to move along the slide rails 332.

The conveying mechanism 34 may include rollers 341 and a linkage part 342, and accommodating notches 312 are formed respectively on the opposite inner surfaces of the rack bars 311 on both sides on the top of the rack 31, so that the rollers 341 are disposed in the two accommodating notches 312 by means of the shafts 343 of both ends. When the laminating mechanism 32 is disposed on the rack 31, the rollers 341 are disposed respectively corresponding to both sides of the laminating mechanism 32, and the conveying surface formed by the end surfaces of the rollers 341 is flushed with the laminating surface of the lower die base 323 in order to assist the movement of the plastic flooring material 60 to be laminated by the laminating mechanism 32. Moreover, the rollers 341 located at both sides of the laminating mechanism 32 are connected respectively by utilizing a linkage part 342, and when the laminating mechanism 32 moves, the rollers 341 can be driven by the laminating mechanism 32 to move.

The drawing mechanism 40 is disposed on the middle or rear section of the production line, and two rollers 42 are disposed opposite to each other in a superimposing manner on a rack 41. The two rollers 42 can be driven by a motor, with the rotation, stopping and rotational speed of the two rollers 42 are controlled by the electric control system 50, so that the two rollers 42 drive the plastic flooring material 60 in a rolling manner to move. The rotational speed at which the drawing mechanism 40 drives the plastic flooring material 60 to move can be synchronized with the speed at which the second power source 331 drives the movable laminator 30 to move. This synchronizing characteristic also achieves the effect of synchronizing and aligning the pattern of the printed layer 62 with the embossing pattern of the die plate 328.

Figure 6:
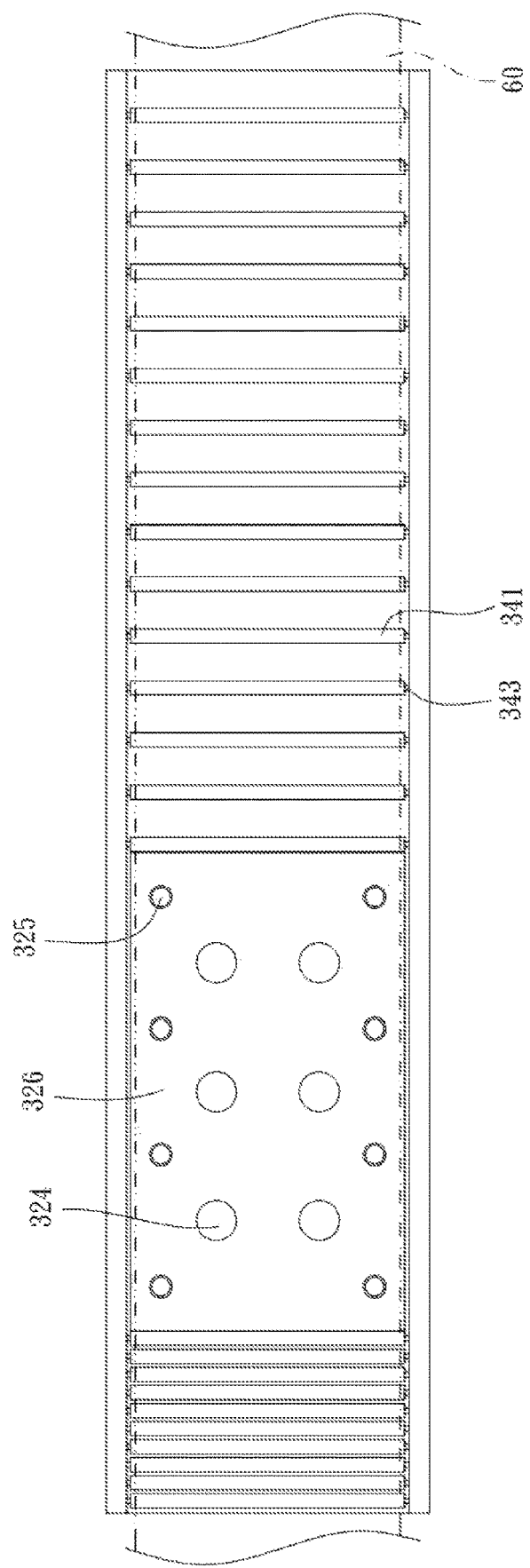
FIG. 6 is another schematic view of the plastic flooring material laminated by the movable laminator of the present invention.

The present invention has the following characteristics: the moving travel of the laminating mechanism 32 located on the rack 31 can be designed to correspond to the length of two pieces of plastic flooring, and is divided into a front section position and a rear section position; when the substrate layer 61, the printed layer 62 and the wear-resisting layer 63 are pre-bonded into the plastic flooring material 60 by the rolling unit 20 and the plastic flooring material 60 is conveyed to the front section position of the movable laminator 30, as shown in FIG. 1, the laminating mechanism 32 is controlled by the electric control system 50 to laminate the plastic flooring material 60, the time of lamination is, for example, 8-10 seconds, approximately equal to the time which the second power source 331 takes to drive the laminating mechanism 32 to move to the rear section position, and at that same time, the plastic flooring material 60 also synchronously arrives at the rear section position, as shown in FIG. 6; after lamination is complete, the laminating mechanism 32 is driven by the second power source 331 to move to the front section position for next lamination, and thereby the continuous production operation of reciprocating lamination is accomplished; and during the reciprocating movement of the laminating mechanism 32, connected by the linkage part 342, the rollers 341 are separated or gathered evenly as the laminating mechanism 32 moves.

Figure 7:
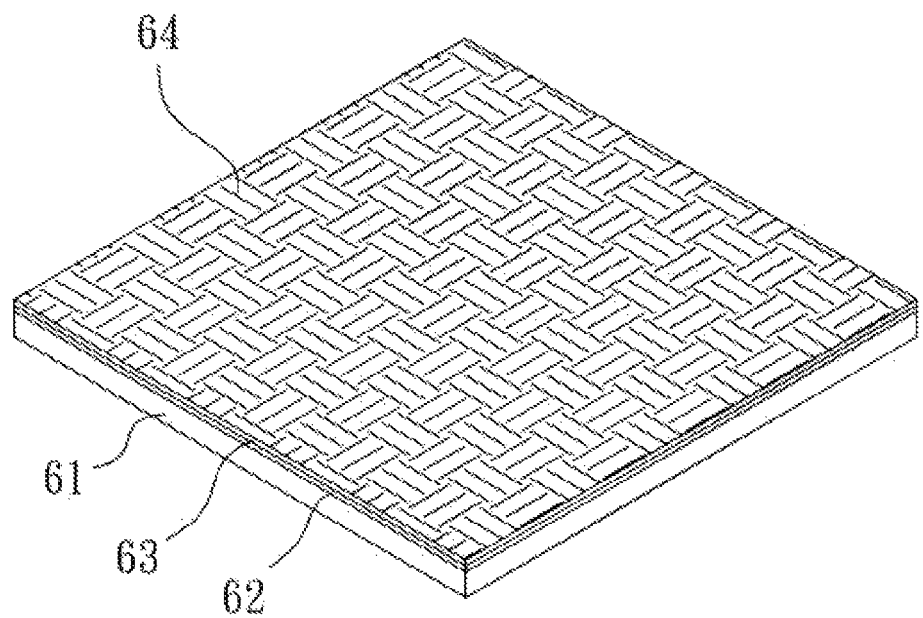
FIG. 7 is a three-dimensional diagram of a finished plastic flooring product laminated by the present invention.
Figure 8:
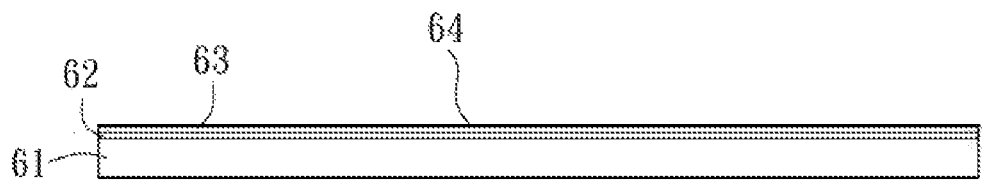
FIG. 8 is an assembly cross-section diagram of the finished plastic flooring product laminated by the present invention.

In addition, because there is a time difference between the speed of conveying the plastic flooring material 60 and the moving speed of the laminating mechanism 32, there will be a space between finished plastic flooring products, and this space can be used as a position where the finished plastic flooring product is cut by the cutter. The schematic diagram and assembly cross-section view of the finished plastic flooring product produced by the present invention are shown as FIGS. 7 and 8. As the pattern structure 64 on the plastic flooring surface is formed by lamination, a clearer and prominent surface pattern can be achieved. Moreover, No matter whether the substrate layer 61 is a PVC material containing plasticizer, presenting a soft characteristic, a PVC material added with foaming agent, presenting an elastic characteristic, or a PVC material without plasticizer, presenting a hard characteristic, the substrate layer 61, the printed layer 62 and the wear-resisting layer 63 can be laminated as a whole by hot pressing or cold pressing, consequently, not only can the efficiency of production be increased, but also the substrate layer 61, the printed layer 62 and the wear-resisting layer 63 do not need to be bonded with adhesive, and therefore environmental friendliness is higher.

To sum up, the present invention has excellent progressive practicability among like products. Moreover, no like structures have been found existing in all domestic and foreign technical documents and literatures associated with such a structure prior to the present invention, so the present invention has possessed the requirements of a patent for the invention applied for according to the law indeed.

The above description is intended to be illustrative only rather than limitative of the present invention. It should be appreciated by those of ordinary skill in the art that various modifications, variations and equivalents can be made without departing from the spirit and scope defined by the claims but shall all fall into the protection scope of the present invention.

The invention claimed is:

1. A movable laminator, wherein the laminator comprises a rack on which a laminating mechanism, a driving mechanism and a conveying mechanism are disposed, wherein, the laminating mechanism comprises an upper die base, a lower die base and at least one first power source which are disposed on a die frame, one end of the first power source is provided with a protruding telescopic shaft, and one end of the telescopic shaft is connected fixedly to an outer edge surface of the upper die base to drive the upper die base to move up and down, the driving mechanism comprises a second power source, two slide rails, and two sliders, the second power source is fixed on the rack, the two slide rails are disposed respectively on both sides of the rack, the two sliders are fixed at positions of the laminating mechanism corresponding to outer sides of the two slide rails, so that the two sliders are embedded in the corresponding slide rails, and a connecting part is disposed between the second power source and the laminating mechanism, so that the laminating mechanism can be driven by the second power source to move on the slide rails;

the conveying mechanism is disposed on a top of the rack, and a conveying surface of the conveying mechanism is on a same horizontal plane as a laminating surface of the lower die base, and the conveying mechanism is configured to assist a movement of a material to be laminated by the laminator;

thus, when the movable laminator laminates the material, speed of lamination matches speed of the material which is conveyed and moved, the laminating mechanism is driven by the second power source to move from a front section position to a rear section position on the rack, after lamination is complete, is driven again by the second power source to move to the front section position for a next laminating operation, and thereby a production operation of reciprocating lamination is accomplished, wherein the conveying mechanism comprises a plurality of rollers, moreover, opposite inner surfaces of rack bars on both sides of the top of the rack are provided respectively with two accommodating notches, and each of the plurality of rollers is disposed in the two accommodating notches by shafts at both ends; when the laminating mechanism is disposed on the rack having the rack bars, the plurality of rollers are located on both sides of the laminating mechanism, and the conveying surface of the conveying mechanism formed by end faces of the plurality of rollers is flushed with the laminating surface of the lower die base; and moreover, the plurality of rollers located on the both sides of the laminating mechanism are connected respectively by a linkage part, when the laminating mechanism moves, the plurality of rollers are driven by the laminating mechanism to move.

2. The movable laminator according to claim 1, wherein the first power source is a hydraulic cylinder.

3. The movable laminator according to claim 1, wherein the outer edge surface of the upper die base corresponding to the lower die base is provided with a die plate, and an embossing pattern is formed on an outer plate surface of the die plate.

4. The movable laminator according to claim 1, wherein the second power source is a servo motor, one end of the servo motor drives a lead screw to rotate, and one end of the connecting part is screwed on the lead screw.

5. A plastic flooring laminating device, wherein the plastic flooring laminating device at least comprises an extruder, a rolling unit, a movable laminator according to claim 1, and a drawing mechanism, and the extruder, the rolling unit, the movable laminator and the drawing mechanism are all connected electrically to an electric control system to laminate a plastic flooring material comprising a substrate layer, a printed layer and a wear-resisting layer into a finished plastic flooring product in an automatic operation mode, wherein, the extruder is configured to form the substrate layer, and one end is provided with a discharge port to extrude out the substrate layer and convey the substrate layer to the rolling unit;

the rolling unit at least comprises a calender, a first unwinding mechanism, and a second unwinding mechanism, the first unwinding mechanism and the second unwinding mechanism respectively convey the printed layer and the wear-resisting layer to the calender, and the calender then utilizes a plurality of guide rollers and pinch rollers to cooperate to roll and pre-bond the substrate layer, the printed layer and the wear-resisting layer into a whole, and then conveys the substrate layer, the printed layer and the wear-resisting layer into the whole to the movable laminator;

the outer edge surface of the upper die base of the movable laminator corresponding to the lower die base is provided with a die plate, and an embossing pattern is formed on an outer plate surface of the die plate;

the drawing mechanism generates conveying power, and is disposed after the movable laminator in an operation procedure of a production line to drive the plastic flooring material to move; and in this way, an automatic reciprocating continuous lamination operation of the plastic flooring material is achieved.

6. The plastic flooring laminating device according to claim 5, wherein the upper die base and the lower die base of the movable laminator utilize electric heating or guide hot oil circulation to generate high temperature and conduct the high temperature to the die plate, so that the laminating mechanism laminates the plastic flooring material into the whole in a hot pressing mode.

7. The plastic flooring laminating device according to claim 5, wherein the upper die base and the lower die base of the movable laminator generate low temperature for cooling by using a cooling water circulation system and conduct the low temperature to the die plate, so that the laminating mechanism laminates the plastic flooring material into the whole in a cool pressing mode.

8. The plastic flooring laminating device according to claim 5, wherein the drawing mechanism comprises two rollers disposed opposite to each other in a superimposing manner on a rack, and rotation, stopping and rotational speed of the two rollers are controlled by the electric control system, so that the two rollers can drive the plastic flooring material in a rolling manner to move.

* * * * *